United States Patent Office 3,527,841
Patented Sept. 8, 1970

3,527,841
ALPHA-CYANOACRYLATE ADHESIVE COMPOSITIONS
Thomas H. Wicker, Jr., and John M. McIntire, Kingsport, Tenn., assignors to Eastman Kodak Company, Rochester, N.Y., a corporation of New Jersey
No Drawing. Filed Apr. 10, 1968, Ser. No. 720,326
Int. Cl. A61b 17/04; C08f 3/62; C08g 17/02
U.S. Cl. 260—823                 11 Claims

ABSTRACT OF THE DISCLOSURE

Alpha-cyanoacrylate adhesive compositions for general and particularly for surgical uses containing poly-(lactic acid) as a viscosity modifier and an acidic component such as $SO_2$ and/or a free radical scavenger such as hydroquinone as a polymerization inhibitor.

---

This invention relates to alpha-cyanoacrylate adhesive compositions for general and particularly for surgical uses. More particularly the invention relates to alpha-cyanoacrylate adhesive compositions containing poly(lactic acid) as a viscosity modifier.

The efficacy of the esters of alpha-cyanoacrylic acid as adhesives for general industrial and other uses is well known, having been described and claimed in numerous U.S. and foreign patents and in the literature. More recently, the medical and patent literature has disclosed that certain of these alpha-cyanoacrylates can be successfully used in many surgical applications as, for example, in the setting of fractured bone structures, as substitutes for, or adjuncts to, surgical sutures, in retarding the flow of blood from wounds and as aids in the repair and regrowth of living tissue generally. One of the problems encountered in the uses of these compositions, both as industrial and as surgical adhesives, has been control of the viscosity or flowability of the adhesive when applied to surfaces to be bonded or otherwise treated.

To take a typical example, when an alpha-cyanoacrylate such as methyl alpha-cyanoacrylate, probably the best known and most widely used cyanoacrylate adhesive, is applied to surfaces to be joined, it is usually applied in its monomeric form, and the resultant polymerization of the ester in situ gives rise to the desired adhesive bond. However, the ester in this form is too fluid at ordinary temperatures to be controllable for certain applications. It is, therefore, necessary to provide a means of controlling the viscosity or flowability of the composition. This is accomplished by adding a viscosity modifier or thickener to the monomeric material.

In certain industrial applications a relatively high degree of fluidity may not be objectionable and may even be desirable, but for other industrial uses and for surgical uses, the viscosity of flowability of the composition must be controlled in order to prevent undue escape of the adhesive from any given area to which it is applied as well as to allow sufficient time for the monomeric material to polymerize and thus to bring about the desired bonding action.

The problem here dealt with has already been generally recognized by workers in this field and a rather wide variety of viscosity modifiers for alpha-cyanoacrylate adhesives have been suggested in patents and the literature. The present invention relates to a viscosity modifier, not heretofore known to the art, for use as a component of this type of adhesive and having unique solubility in alpha-cyanoacrylates and an unusually high order of heat stability. These properties render such modifiers particularly advantageous when used as components of surgical adhesives which must be subjected to relatively high heat sterilization procedures in order to provide that the resulting compositions shall be absolutely sterile and safe for their intended uses.

Another requirement of alpha-cyanoacrylate adhesive compositions which are to be employed for surgical uses is that both the adhesive component and the viscosity modifier must be relatively non-toxic and each component must be biodegradable, that is, each must be susceptible of biochemical transformation or degradation which will result in harmless products which can be readily absorbed into and carried away from the point of application by the body fluids and thus ultimately eliminated from the system. As will be more fully set forth hereinafter, the adhesive compositions or the present invention fully meet these requirements.

This invention has as an object to provide alpha-cyanoacrylate adhesive compositions having viscosity and other characteristics which render them outstandingly useful as adhesives.

A further object is to provide alpha-cyanoacrylate adhesive compositions having viscosity and other characteristics which render them particularly useful for surgical applications.

A further object is to provide alpha-cyanoacrylate adhesive compositions particularly adapted for use in the surgical field and characterized by the fact that both the adhesive and the viscosity modifying components are biodegradable.

A further object is to provide alpha-cyanoacrylate adhesive compositions for both general and surgical uses containing a viscosity modifier which is soluble in a wide range of the esters of alpha-cyanoacrylic acid and having a high degree of stability under heat sterilization conditions.

A still further object is to provide alpha-cyanoacrylate adhesive compositions containing a biodegradable viscosity modifier and stabilized against polymerization by the presence therein of a polymerization inhibitor.

Other objects will appear hereinafter.

These objects are accomplished by the following invention which comprises adding to a monomeric ester of alpha-cyanoacrylic acid having the general formula:

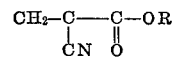

wherein R is an alkyl group of 1–16 carbon atoms, an alkoxyalkyl group, an acyloxyalkyl group, a haloalkyl group, an arylalkyl group, a cyanoalkyl group, a cyclohexyl group, a phenyl group or an alkenyl group of 2–16 carbon atoms, as a viscosity modifier up to 25 percent by weight, based on the weight of the monomeric ester, of poly(lactic acid). The preferred range of the viscosity modifier is from 1 to 5 percent by weight.

Typical monomeric alpha-cyanoacrylates suitable for use in the adhesive composition of our invention are the methyl, ethyl, n-propyl, isopropyl, n-butyl, iso-butyl, n-amyl, isoamyl, 3-acetoxypropyl, 2-methoxyethyl, 3-methoxypropyl, 3-chloropropyl, benzyl, phenyl, and alkenyl alpha-cyanoacrylates.

The alpha-cyanoacrylate esters can be produced by the procedure of the U.S. patent to Joyner and Hawkins, 2,721,858, involving reaction of an alkyl cyanoacetate with formaldehyde in a non-aqueous organic solvent and in the presence of a basic catalyst, followed by pyrolysis of the anhydrous intermediate polymer in the presence of a polymerization inhibitor. The alpha-cyanoacrylate monomers prepared with low moisture content and essentially free of impurities have the best activity for surgical use. Another suitable process for preparing such alpha-cyanoacrylate esters is that described in the U.S. patent to Hawkins and McCurry, 3,254,111.

In order to stabilize the compositions of our invention against too rapid polymerization in use, and also to give them a satisfactory shelf life, one or more polymerization inhibitors may be employed. The inhibiting material may be an acidic stabilizer or a free radical scavenger. In some cases, both an acidic stabilizer and a free radical scavenger may be employed if desired. A free radical scavenger may be defined as a material which has the ability to react with an unpaired electron to produce a substance which does not initiate further polymerization.

Examples of acidic stabilizers useful in the adhesive compositions of our invention are: sulfur dioxide, nitrogen oxide, phosphoric acid, phosphorous acid, boron trifluoride, organic acids having a pKa of 1 to 3, and polyphosphoric acid. For adhesive compositions designed for general or industrial uses, the stabilizer may be present to the extent of .0005–.06 percent by weight of the total composition, the preferred range being .0005–.003. In compositions designed for surgical uses, the stabilizer may be present in amounts within the range of .004–.25 percent by weight.

Among the free radical scavengers which may be employed as stabilizers in the adhesive compositions of our invention may be mentioned: hydroquinone, monomethyl ether of hydroquinone, butylated hydroxyanisole, butylated hydroxytoluene and t-butyl hydroquinone. For adhesive compositions designed for both general and surgical use, the free radical scavenger may be present to the extent of .001–.15 percent by weight of the total composition, the preferred range being .08–.12 percent.

The poly(lactic acid) component employed as the viscosity modifier in accordance with our invention may be prepared by polymerizing lactide

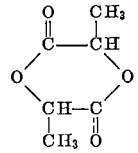

and has the repeating unit

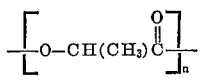

in which the identity of the end groups is not known. Its preparation is described in U.S. Army Medical Biomechanical Research Laboratory Technical Report No. 6608 entitled "Poly(lactic acid) for Surgical Inplants" (obtainable as Document AD 636,716 from Clearinghouse for Federal, Scientific and Technical Information, Department of Commerce, Washington, D.C.). The polymer can be prepared in a range of molecular weights by choice of catalyst or catalyst concentration, monomer purity, reaction time and temperature. This polymer is biodegradable and we have found that it is quite unexpectedly very soluble in methyl-2-cyanoacrylate and its higher alkyl homologues.

In formulating adhesive compositions in accordance with our invention, the concentration of poly(lactic acid) in the monomeric alpha-cyanoacrylate may, as indicated above, be within the range of 1–25 percent by weight of the total composition. The amount of the poly(lactic acid) employed in any given composition will depend on the inherent viscosity of the particular polymer employed. In general, a polymer having an I.V. within the range of .5–2 is satisfactory but polymers of higher I.V. may be employed if desired.

The following examples are included for a better understanding of the invention.

EXAMPLE 1

To 10.00 g. of methyl 2-cyanoacrylate is added 0.50 g. of poly(lactic acid) having an inherent viscosity of 2.04. The mixture is tumbled in a sealed glass container for three hours at 70° C. to complete solution. The viscosity of the resulting solution is found to be 85 cp. The solution is then sterilized at 125° C. for 1 hour giving a solution with slightly decreased viscosity.

EXAMPLE 2

A 5% solution of poly(lactic acid) in butyl 2-cyanoacrylate is prepared by dissolving 0.50 g. of poly(lactic acid) (I.V.=2.04) in 10.00 g. of butyl 2-cyanoacrylate and tumbling for three hours at 70° C. The solution is found to have an initial viscosity of 89 cp. Upon sterilization at 140° C. the viscosity decreases slightly.

EXAMPLE 3

Ten grams of isobutyl 2-cyanoacrylate containing 0.01 g. of hydroquinone is thickened with 0.50 g. of poly(lactic acid) (I.V.=2.04) to give a solution with a viscosity of 110 cp. The solution is then sterilized at 140° C. for one hour. The solution viscosity is found to be 114 cp. after sterilization.

EXAMPLE 4

Five grams of a high I.V. poly(lactic acid) (I.V.=2) is dissolved in 100 g. of n-hexyl 2-cyanoacrylate. The initial solution viscosity is approximately 80 cp. Upon sterilization at 150° C. a clear, viscous formulation is obtained which is suitable for surgical purposes.

EXAMPLE 5

A solution having an initial viscosity of approximately 80 cp. is obtained when 7.0 g. of a medium I.V. poly(lactic acid) (I.V.=1.2) is dissolved in 100 g. of 3-methoxybutyl-2-cyanoacrylate by tumbling at 70° C. for three hours. No change in viscosity is noted after sterilization for one hour at 130° C.

EXAMPLE 6

A 12% solution of low I.V. poly(lactic acid) (I.V.=0.5) in ethyl 2-cyanoacrylate has a viscosity of approximately 100 cp. Heat sterilization at 130° C. gives a clear, stable, viscous solution suitable for surgical purposes.

EXAMPLE 7

A high I.V. poly(lactic acid) (I.V.=2) is acylated by treating with an acetic anhydride-acetic acid mixture. The resulting end-capped polymer is dissolved in butyl 2-cyanoacrylate. Five percent of the polymer is required to give a solution viscosity of approximately 80 cp. The solution viscosity does not change on sterilization for one hour at 140° C.

EXAMPLE 8

Five grams of a high I.V. poly(lactic acid) (I.V.~2) is dissolved in 95 g. of n-decyl 2-cyanoacrylate. The initial solution viscosity is about 82 cp. Upon sterilization at 150° C. a clear, viscous formulation is obtained which can be used for surgical purposes.

The alpha-cyanoacrylate adhesive compositions of our invention are distinguished from all previously known alpha-cyanoacrylate adhesive compositions by the presence therein of a viscosity modifier comprising poly(lactic acid). As indicated above, this modifier is unique in that it is soluble in the entire range of alkyl esters of 2-cyanoacrylic acid and possesses such heat stability characteristics that the resulting viscous solution in the alpha-cyanoacrylic component can be heat sterilized to provide sterile, biodegradable surgical adhesives, as well as adhesives for general industrial use.

These viscous adhesive compositions have a number of advantages over the water-thin monomeric materials which have been used heretofore in tissue adhesive applications. A primary advantage of the viscous adhesives of our invention is that the placement of the adhesive in the body can be more accurately controlled since the tendency of the material to run after application to the site is considerably reduced. Another feature of our viscous adhesives is that they are completely clear and free of cloudy material even after a heat sterilization treatment at 125–150° C. or even higher. An additional advantage of cyanoacrylate surgical adhesives thickened with poly(lactic acid) is that these adhesives exhibit a high order of stability in the heat sterilizaiton treatment. While we rely on no theory to explain this high order of stability, it may be that the polymeric material undergoes hydrolysis in the presence of adventitious moisture to create stabilizing acid groups.

While the emphasis in the above description of our invention has been laid on a process for preparing sterile cyanoacrylate adhesive compositions particularly adapted for surgical applications, it will, of course, be understood that such compositions are adapted for a wide variety of industrial and other applications in which the sterile nature of the composition is not of importance.

Although the invention had been described in considerable detail with particular reference to certain preferred embodiments thereof, variations and modifications can be effected within the spirit and scope of the invention as described hereinabove, and as defined in the appended claims.

We claim:
1. An adhesive composition comprising at least 75 percent by weight of a monomeric ester of alpha-cyanoacrylic acid having the general formula:

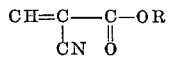

wherein R is an alkyl group of 1–16 carbon atoms, an alkoxy-alkyl group, an acyloxyalkyl group, a haloalkyl group, an arylalkyl group, a cyanoalkyl group, a cyclohexyl group, a phenyl group or an alkenyl group of 2–16 carbon atoms and, as a viscosity modifier, up to 25 percent by weight of poly(lactic acid).

2. The composition of claim 1 in which the monomeric ester of alpha-cyanoacrylic acid has the general formula:

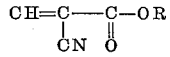

wherein R is an alkyl group of 1–10 carbon atoms.

3. The composition of claim 2 containing at least about 95 percent by weight of the monoemric ester of alpha-cyanoacrylic acid and up to about 5 percent by weight of poly(lactic acid).

4. The composition of claim 1 which contains at least .0005 percent by weight of acidic stabilizer.

5. The composition of claim 1 which contains at least .001 percent by weight of a free radical scavenger.

6. The composition of claim 3 which contains at least .0005 percent by weight of an acidic stabilizer.

7. The composition of claim 3 which contains at least .001 percent by weight of a free radical scavenger.

8. The composition of claim 2 containing at least about 95 percent by weight of methyl 2-cyanoacrylate, up to about 5 percent by weight of poly(lactic acid) and at least .0005 percent by weight of an acidic stabilizer.

9. The composition of claim 2 containing at least about 95 percent by weight of methyl 2-cyanoacrylate, up to about 5 percent by weight of poly(lactic acid) and .001–.15 percent by weight of hydroquinone.

10. The composition of claim 2 containing at least about 95 percent by weight of isobutyl 2-cyanoacrylate, up to about 5 percent by weight of poly(lactic acid) and at least .0005 percent by weight of an acidic stabilizer.

11. The composition of claim 2 containing at least about 95 percent by weight of isobutyl 2-cyanoacrylate, up to about 5 percent by weight of poly(lactic acid) and .001–.15 percent by weight of hydroquinone.

References Cited

UNITED STATES PATENTS

| | | | |
|---|---|---|---|
| 3,223,083 | 12/1965 | Cobey | 128—92 |
| 3,264,249 | 8/1966 | Araki | 260—32.4 |
| 3,297,033 | 1/1967 | Schmitt | 128—335.5 |

FOREIGN PATENTS 95,550  3/1963  Denmark.

OTHER REFERENCES

Carton, C. A., et al., Journal of Neurosurgery, 18 (1961), p. 188.

JOSEPH L. SCHOFER, Primary Examiner

C. A. HENDERSON, Jr., Assistant Examiner

U.S. Cl. X.R.

128—92, 334; 260—78.3, 78.4